(12) United States Patent
Patton et al.

(10) Patent No.: US 10,413,762 B2
(45) Date of Patent: Sep. 17, 2019

(54) LOAD INDICATOR AND HORIZONTAL LIFELINE SYSTEM INCLUDING THE SAME

(71) Applicant: WERNER CO., Greenville, PA (US)

(72) Inventors: Justin S. Patton, Franklin, PA (US); Tracee Leonardson, Ashtabula, OH (US); Cody Rappoport, Greenville, PA (US)

(73) Assignee: WERNER CO., Greenville, PA (US)

( * ) Notice: Subject to any disclaimer, the term of this patent is extended or adjusted under 35 U.S.C. 154(b) by 113 days.

(21) Appl. No.: 15/789,336

(22) Filed: Oct. 20, 2017

(65) Prior Publication Data

US 2019/0118011 A1    Apr. 25, 2019

(51) Int. Cl.
| | | |
|---|---|---|
| *A62B 35/04* | (2006.01) | |
| *A62B 35/00* | (2006.01) | |
| *F16B 7/06* | (2006.01) | |
| *F16G 11/00* | (2006.01) | |

(52) U.S. Cl.
CPC .......... *A62B 35/04* (2013.01); *A62B 35/0037* (2013.01); *A62B 35/0056* (2013.01); *A62B 35/0068* (2013.01); *A62B 35/0075* (2013.01); *F16B 7/06* (2013.01); *F16G 11/00* (2013.01)

(58) Field of Classification Search
CPC . A62B 35/0037; A62B 35/04; A62B 35/0043; A62B 35/0056; A62B 35/0068; A62B 35/0075; F16B 7/06
See application file for complete search history.

(56) References Cited

U.S. PATENT DOCUMENTS

| | | | | |
|---|---|---|---|---|
| 716,633 | A  * | 12/1902 | Hains ........................ | F16F 3/04 |
| | | | | 213/40 S |
| 1,473,677 | A  * | 11/1923 | Hoffmann ............... | F16G 11/12 |
| | | | | 280/854 |
| 1,616,133 | A  * | 2/1927 | Lowy ................... | A47C 23/155 |
| | | | | 16/72 |
| 2,420,202 | A  * | 5/1947 | Setz ....................... | G01N 3/062 |
| | | | | 73/793 |

(Continued)

FOREIGN PATENT DOCUMENTS

| | | |
|---|---|---|
| GB | 2 333 532 A | 7/1989 |
| GB | 2 217 421 A | 10/1989 |
| GB | 2 344 628 A | 6/2000 |

*Primary Examiner* — Colleen M Chavchavadze
(74) *Attorney, Agent, or Firm* — Eckert Seamans Cherin & Mellott, LLC

(57) ABSTRACT

A load indicator includes a first connector, a second connector arranged such that pulling the first connector and the second connector in opposite directions applies tension across the load indicator, a fastener structured to attach the first connector to the second connector, a first spring structured to apply bias to the fastener to pull the first and second connectors together, and a moveable member disposed between the first and second connectors and around the fastener. When the tension across the load indicator is at or above a predetermined tension level, the first spring compresses allowing the moveable member to spin freely about the fastener. When the tension across the load indicator is below the predetermined tension level, the first spring pulls the first and second connectors together such that the moveable member cannot spin freely about the fastener.

17 Claims, 16 Drawing Sheets

(56) References Cited

U.S. PATENT DOCUMENTS

| | | | | |
|---|---|---|---|---|
| 2,538,757 A * | 1/1951 | Bratthauer | ............... | F16B 7/06 |
| | | | | 403/27 |
| 3,444,957 A | 5/1969 | Ervin, Jr. | | |
| 3,983,965 A * | 10/1976 | Wright, Jr. | ........... | F16F 7/1022 |
| | | | | 188/380 |
| 4,094,387 A * | 6/1978 | Pelat | ....................... | F16L 3/202 |
| | | | | 188/381 |
| 4,103,760 A * | 8/1978 | Yang | .................... | F16F 7/1022 |
| | | | | 188/134 |
| 4,446,944 A | 5/1984 | Forrest et al. | | |
| 4,538,702 A * | 9/1985 | Wolner | ................ | A62B 35/04 |
| | | | | 182/230 |
| 5,090,503 A | 2/1992 | Bell | | |
| 5,143,187 A | 9/1992 | McQuarrie et al. | | |
| 5,174,410 A | 12/1992 | Casebolt | | |
| 5,220,977 A | 6/1993 | Wolner | | |
| 5,316,102 A * | 5/1994 | Bell | .................... | E04G 21/3261 |
| | | | | 182/3 |
| 5,332,071 A * | 7/1994 | Duncan | ................ | A62B 35/04 |
| | | | | 188/371 |
| 5,358,068 A * | 10/1994 | Whitmer | ................ | A62B 35/04 |
| | | | | 182/113 |
| 5,361,867 A * | 11/1994 | Olson | .................... | F16F 7/123 |
| | | | | 116/203 |
| 5,458,214 A * | 10/1995 | Olson | ................ | A62B 35/0056 |
| | | | | 182/18 |
| 5,458,221 A * | 10/1995 | Flux | ...................... | A62B 35/04 |
| | | | | 188/371 |
| 5,598,900 A | 2/1997 | O'Rourke | | |
| 5,771,993 A | 6/1998 | Anderson et al. | | |
| 6,149,132 A * | 11/2000 | Ostrobrod | .......... | A62B 35/0056 |
| | | | | 254/368 |
| 6,338,399 B1 | 1/2002 | Choate | | |
| 6,378,651 B1 | 4/2002 | Ecker et al. | | |
| 6,446,936 B1 | 9/2002 | Ostrobrod | | |
| 6,471,198 B2 * | 10/2002 | Herbst | ...................... | F16F 1/40 |
| | | | | 188/381 |
| 6,779,630 B2 * | 8/2004 | Choate | ............... | A62B 35/0056 |
| | | | | 182/36 |
| 6,805,220 B2 * | 10/2004 | Fulton | ................ | A62B 35/0068 |
| | | | | 182/3 |
| 6,945,356 B2 * | 9/2005 | Luke | .................. | A62B 35/0056 |
| | | | | 182/18 |
| 7,188,704 B2 | 3/2007 | Renton et al. | | |
| 7,258,316 B2 * | 8/2007 | Reeves | ................ | A63B 29/024 |
| | | | | 248/231.91 |
| 8,157,057 B1 * | 4/2012 | Johnson | .................. | E04G 5/001 |
| | | | | 182/112 |
| 8,292,028 B2 | 10/2012 | Wise | | |
| 8,584,799 B1 | 11/2013 | Dennington | | |
| 8,701,826 B2 | 4/2014 | Smith et al. | | |
| 9,272,168 B2 | 3/2016 | Parker et al. | | |
| 9,480,865 B2 | 11/2016 | Naylor et al. | | |
| 9,824,841 B2 * | 11/2017 | Tsang | ..................... | H01H 71/50 |
| 10,072,997 B2 * | 9/2018 | Bubar | .................. | H01H 3/0226 |
| 10,125,837 B1 * | 11/2018 | Fegley | ..................... | F16F 7/006 |
| 10,149,991 B2 * | 12/2018 | Schurian | .................. | A62B 35/04 |
| 2004/0145098 A1 * | 7/2004 | Thaler | .................... | A62B 35/04 |
| | | | | 267/33 |
| 2005/0230184 A1 | 10/2005 | Ansaldo | | |
| 2006/0272891 A1 * | 12/2006 | Casebolt | .................. | A62B 1/04 |
| | | | | 182/36 |
| 2007/0062759 A1 * | 3/2007 | Jones | .................... | A62B 35/04 |
| | | | | 182/3 |
| 2008/0006750 A1 * | 1/2008 | Flux | .................... | A62B 35/005 |
| | | | | 248/231.9 |
| 2008/0035423 A1 * | 2/2008 | Meillet | ............. | A62B 35/0056 |
| | | | | 182/3 |
| 2008/0179136 A1 | 7/2008 | Griffith | | |
| 2018/0117374 A1 * | 5/2018 | Pascoe | ............... | A62B 35/0068 |

* cited by examiner

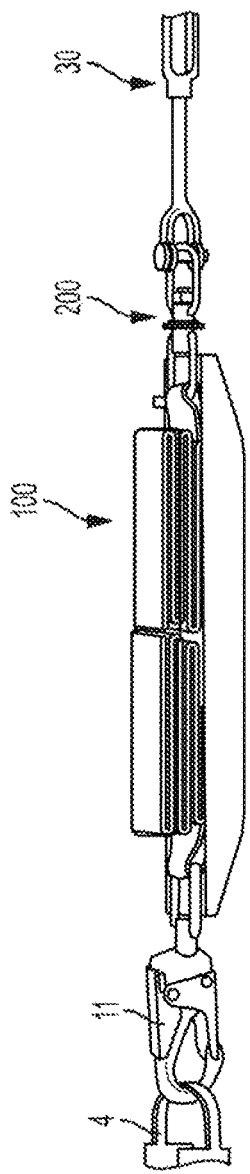

LOAD INDICATOR AND HORIZONTAL LIFELINE SYSTEM INCLUDING THE SAME

CROSS-REFERENCE TO RELATED APPLICATION

This application is related to co-pending U.S. patent application Ser. No. 15/789,336 filed on Oct. 20, 2017, entitled "ENERGY ABSORBER COVER AND HORIZONTAL LIFELINE SYSTEM INCLUDING THE SAME", the entirety of which is incorporated herein by reference.

BACKGROUND

Field

The disclosed concept relates generally to fall protection systems, and in particular, to horizontal lifeline systems. The disclosed concept also pertains to energy absorbers for use in horizontal lifeline systems.

Background Information

In fall protection systems, a worker typically wears a safety harness. In some fall protection systems, the safety harness is attached to a horizontal lifeline system via a lanyard or another attachment mechanism. Horizontal lifeline systems typically span horizontally between attachment points such as anchors in a structure. In an arrest situation, such as when a worker falls, the horizontal lifeline system will deploy to slow and stop the fall of the worker. Horizontal lifeline systems often include an energy absorber that deploys in an arrest situation to reduce the forces applied to the worker in the case of a fall.

Energy absorbers typically consist of packaged tear webbing. In the event of a fall, the forces on the energy absorber cause the webbing to tear apart. The tearing absorbs energy, which slows the fall of the worker and reduces the impact forces on the worker. The webbing is generally packaged in a bag made of fabric. A fabric bag is a simple solution to packaging the energy absorber. However, the fabric bag is susceptible to wear and tear and can expose the webbing to wear and tear as well. There is room for improvement in energy absorbers.

When a horizontal lifeline system is installed, an amount of pre-tension should be applied to hold the horizontal lifeline taut and prevent it from sagging. If the amount of tension applied is too low, the horizontal lifeline system will sag. It is important that a sufficient amount of tension be applied to a horizontal lifeline. However, it is also desirable to have a simple and cost effective manner of determining whether sufficient tension has been applied. There is room for improvement in determining the tension of horizontal lifelines.

SUMMARY

These needs and others are met by embodiments of the disclosed concept in which a load indicator provides an indication when a predetermined tension level across the load indicator has been reached.

In accordance with one aspect of the disclosed concept, a load indicator comprises: a first connector; a second connector arranged such that pulling the first connector and the second connector in opposite directions applies tension across the load indicator; a fastener structured to attach the first connector to the second connector; a first spring structured to apply bias to the fastener to pull the first and second connectors together; and a moveable member disposed between the first and second connectors and around the fastener, wherein when the tension across the load indicator is at or above a predetermined tension level, the first spring compresses allowing the moveable member to spin freely about the fastener, and wherein when the tension across the load indicator is below the predetermined tension level, the first spring pulls the first and second connectors together such that the moveable member cannot spin freely about the fastener.

In accordance with another aspect of the disclosed concept, a horizontal lifeline system comprises: a first termination arrangement structured to attach to a first anchor point; a second termination arrangement structured to attach to a second anchor point; a horizontal lifeline cable coupled to the first termination arrangement; a load indicator coupled between the first and second termination arrangements, the load indicator comprising: a first connector; a second connector arranged such that pulling the first connector and the second connector in opposite directions applies tension across the load indicator; a fastener structured to attach the first connector to the second connector; a first spring structured to apply bias to the fastener to pull the first and second connectors together; and a moveable member disposed between the first and second connectors and around the fastener, wherein when the tension across the load indicator is at or above a predetermined tension level, the first spring compresses allowing the moveable member to spin freely about the fastener, wherein when the tension across the load indicator is below the predetermined tension level, the first spring pulls the first and second connectors together such that the moveable member cannot spin freely about the fastener, and wherein the tension across the load indicator is substantially the same as tension in the horizontal lifeline cable.

BRIEF DESCRIPTION OF THE DRAWINGS

A full understanding of the disclosed concept can be gained from the following description of the preferred embodiments when read in conjunction with the accompanying drawings in which:

FIG. 15 is a view of an energy absorber and load indicator in accordance with an example embodiment of the disclosed concept.

DESCRIPTION OF THE PREFERRED EMBODIMENTS

Figure 1:
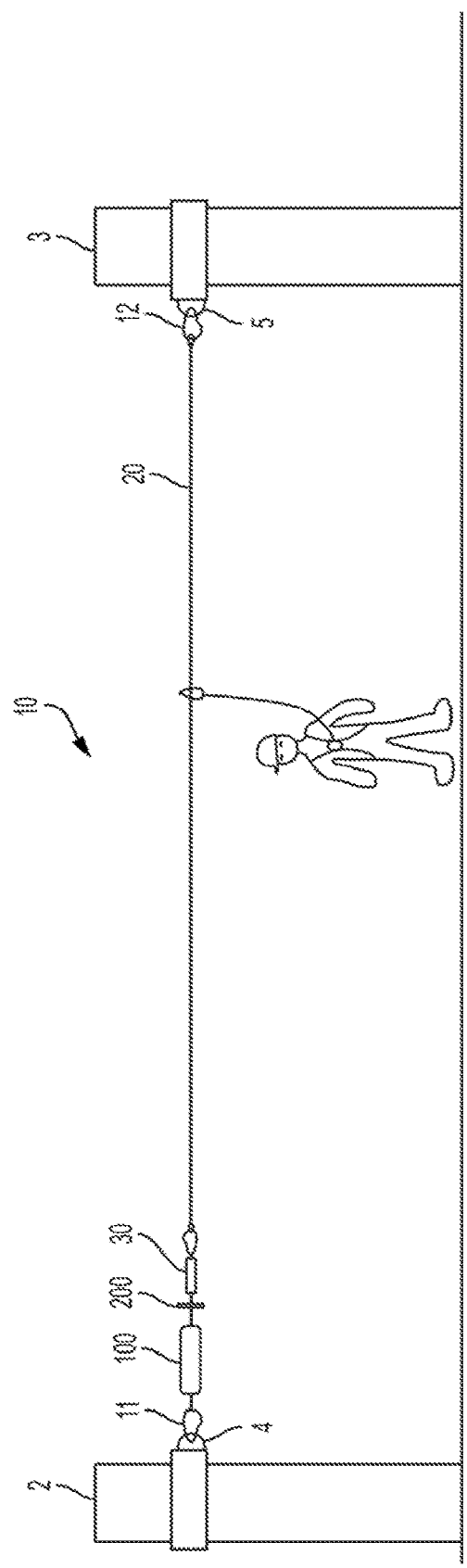
FIG. 1 is a view of a horizontal lifeline system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
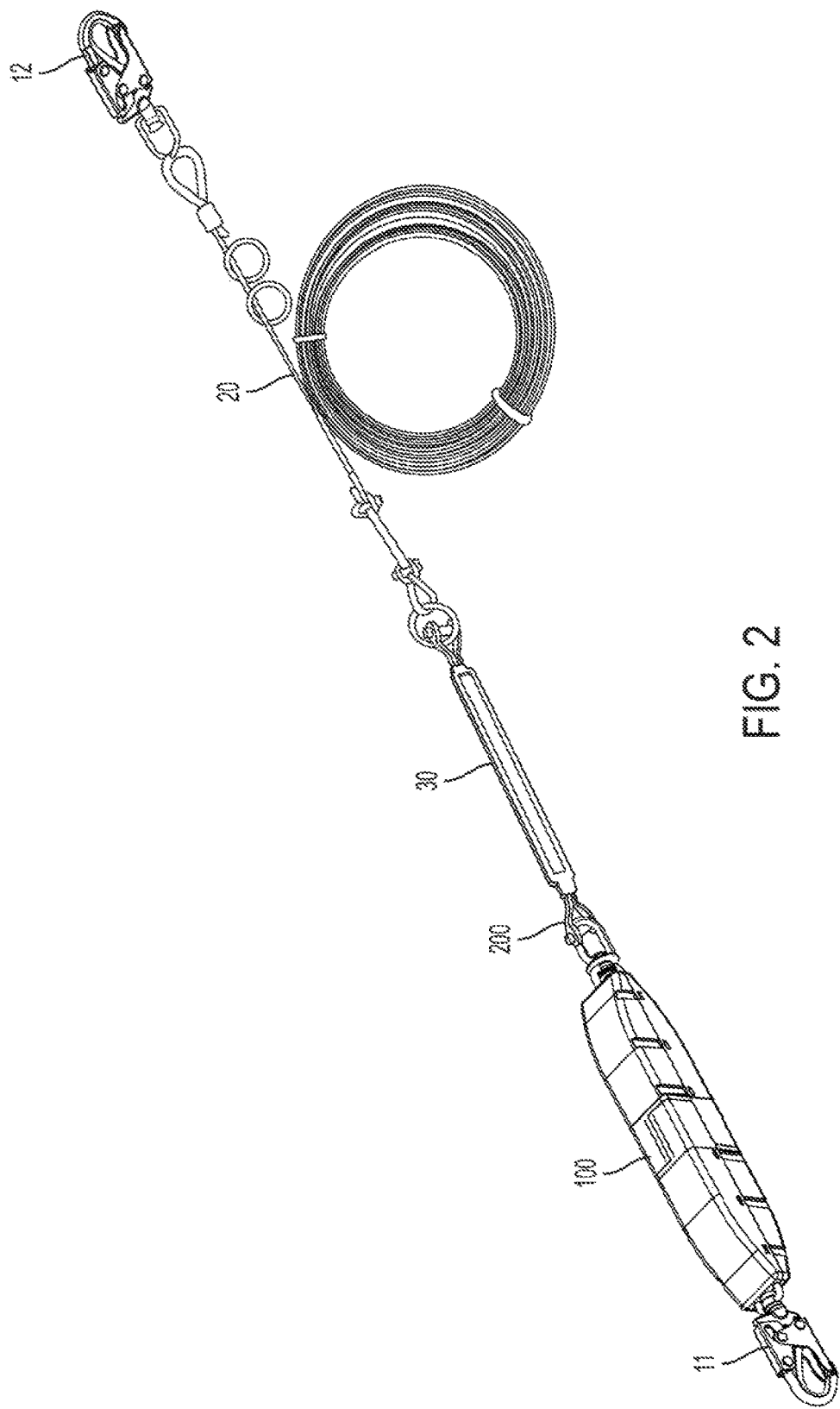
FIG. 2 is a view of elements of the horizontal lifeline system of FIG. 1.

FIG. 1 is an illustration of a horizontal lifeline system 10 in accordance with an example embodiment of the disclosed concept and FIG. 2 is an illustration of elements of the horizontal lifeline system 10 in accordance with an example embodiment of the disclosed concept. The horizontal lifeline system 10 includes termination arrangements 11,12 structured to attach the horizontal lifeline system 10 between anchor points 4,5 on corresponding structures 2,3. The anchor points 2,3 may be located on, for example and without limitation, permanent structures such as a building or other construction. The anchor points may also be located on temporary structures attached to another structure to provide a place to attach the horizontal lifeline system 10. The anchor points 4,5 may include, for example and without limitation, a ring, an eyelet, a bracket, a post, a strap, or any other mechanism that provides a place to attach the horizontal lifeline system 10 to the corresponding structures 2,3. While some examples of anchor points 4,5 have been provided, it will be appreciated by those having ordinary skill in the art that any suitable anchor point may be employed in conjunction with the horizontal lifeline system 10 without departing from the scope of the disclosed concept.

The horizontal lifeline system 10 includes termination arrangements 11,12 provided at each of its ends. The termination arrangements 11,12 are structured to attach to corresponding anchor points 4,5. The termination arrangements 11,12 may include, for example and without limitation, hooks, carabiners, rings, etc. While some examples of termination arrangements 11,12 have been provided, it will be appreciated by those having ordinary skill in the art that any suitable termination arrangements that are capable of attaching the horizontal lifeline system 10 to corresponding anchor points 4,5 may be employed without departing from the scope of the disclosed concept.

The horizontal lifeline system 10 further includes a tensioner 30 and a horizontal lifeline cable 20. The tensioner 30 and the horizontal lifeline cable 20 are disposed between the termination arrangements 11,12. One end of the tensioner 30 is attached to the horizontal lifeline cable 20. The tensioner 30 is coupled, either directly, or indirectly via one or more additional components, to one of the termination arrangements 12. The horizontal lifeline cable 20 is coupled, either directly, or indirectly via one or more additional components, to the other of the termination arrangements 11.

The tensioner 30 is structured to provide tension for the horizontal lifeline cable 20. In some example embodiments of the disclosed concept, the tensioner 30 may be a turnbuckle, such as twist turnbuckle, that may be twisted to increase or decrease the tension on the horizontal lifeline cable 20. However, it will be appreciated by those having ordinary skill in the art, that any suitable device for adjusting the tension of the horizontal lifeline cable 20 may be employed without departing from the scope of the disclosed concept.

The horizontal lifeline system 10 further includes an energy absorber 100 and a load indicator 200. The energy absorber 100 includes a cover 102 (shown in FIG. 3). The cover 102 encloses packed webbing 104 (also shown in FIG. 3). In the event of a fall, the cover 102 breaks apart and the webbing 104 deploys in order to absorb the energy of the fall and reduce the forces on the worker. In some example embodiments of the disclosed concept, the webbing 104 is tear webbing. The tear webbing may be stitched together in the folded shape shown for example in FIG. 3. The forces applied to the webbing 104 during a fall cause the stitching to tear apart and the webbing 104 to unfold. The tearing absorbs energy and slows the worker's fall such that impact forces are reduced. It will be appreciated that other types of webbing 104 or materials may be employed in the energy absorber 100 without departing from the scope of the disclosed concept. The cover 102 will be described in more detail with respect to FIGS. 3-12.

The horizontal lifeline system 10 additionally includes a load indicator 200. The load indicator 200 is structured to provide an indication when the tension in the horizontal lifeline cable 20 reaches a predetermined level. In some example embodiments of the disclosed concept, the load indicator 200 includes a washer that is only able to spin freely once the tension in the horizontal lifeline cable 20 has reached the predetermined level.

Figure 3:
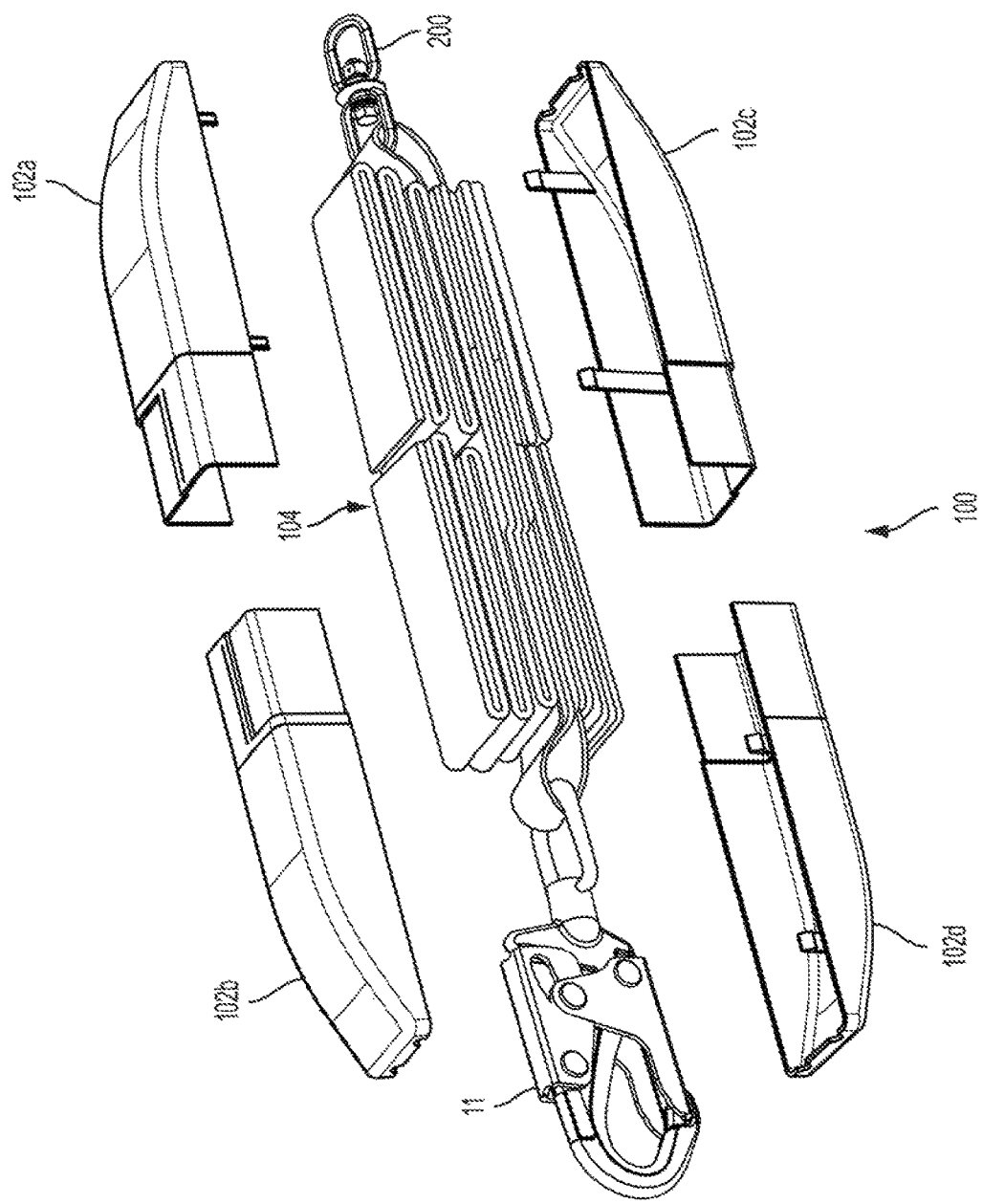
FIGS. 3-6 illustrate steps of assembling a cover for an energy absorber in accordance with an example embodiment of the disclosed concept.
Figure 4:
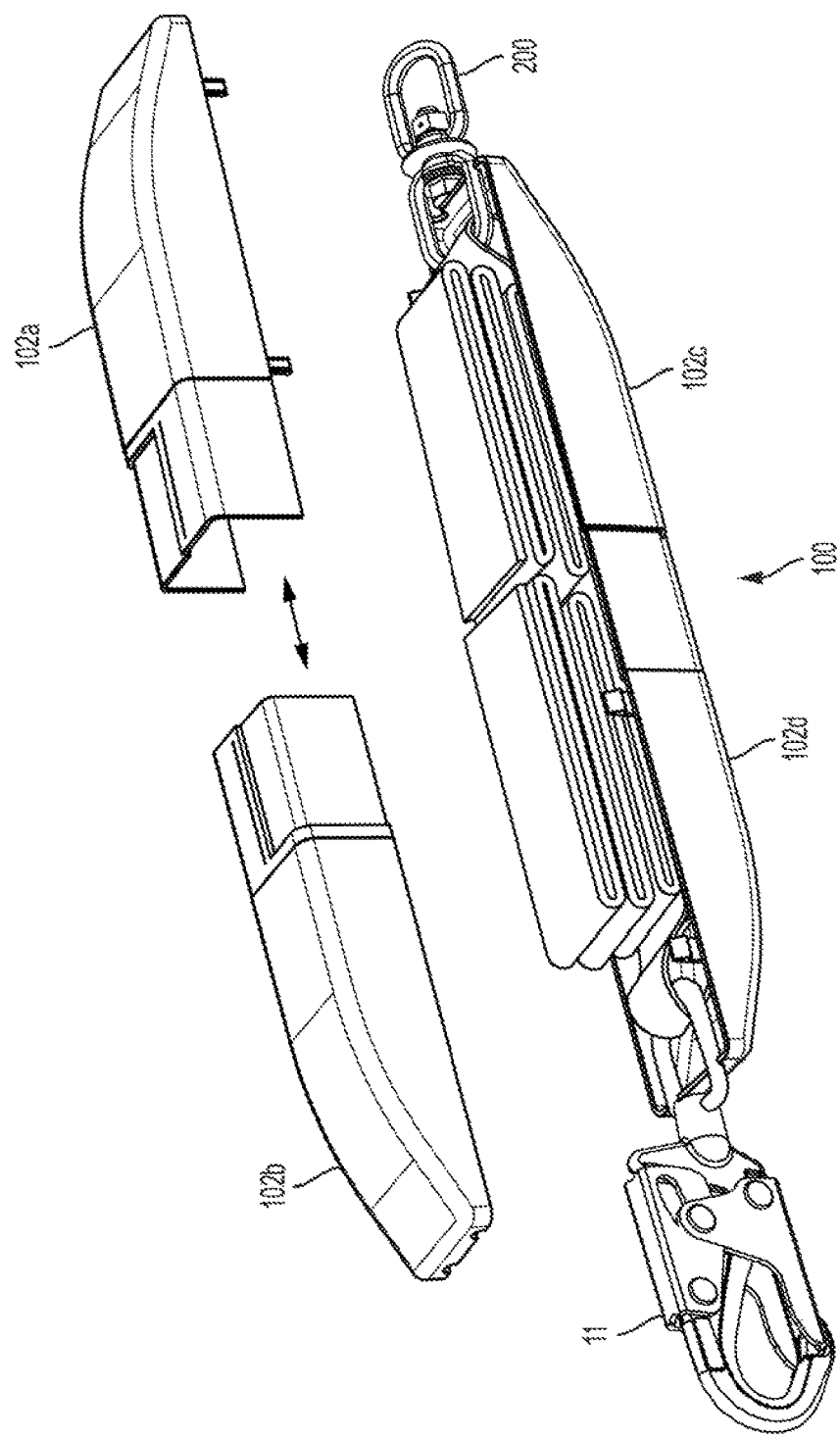
Figure 5:
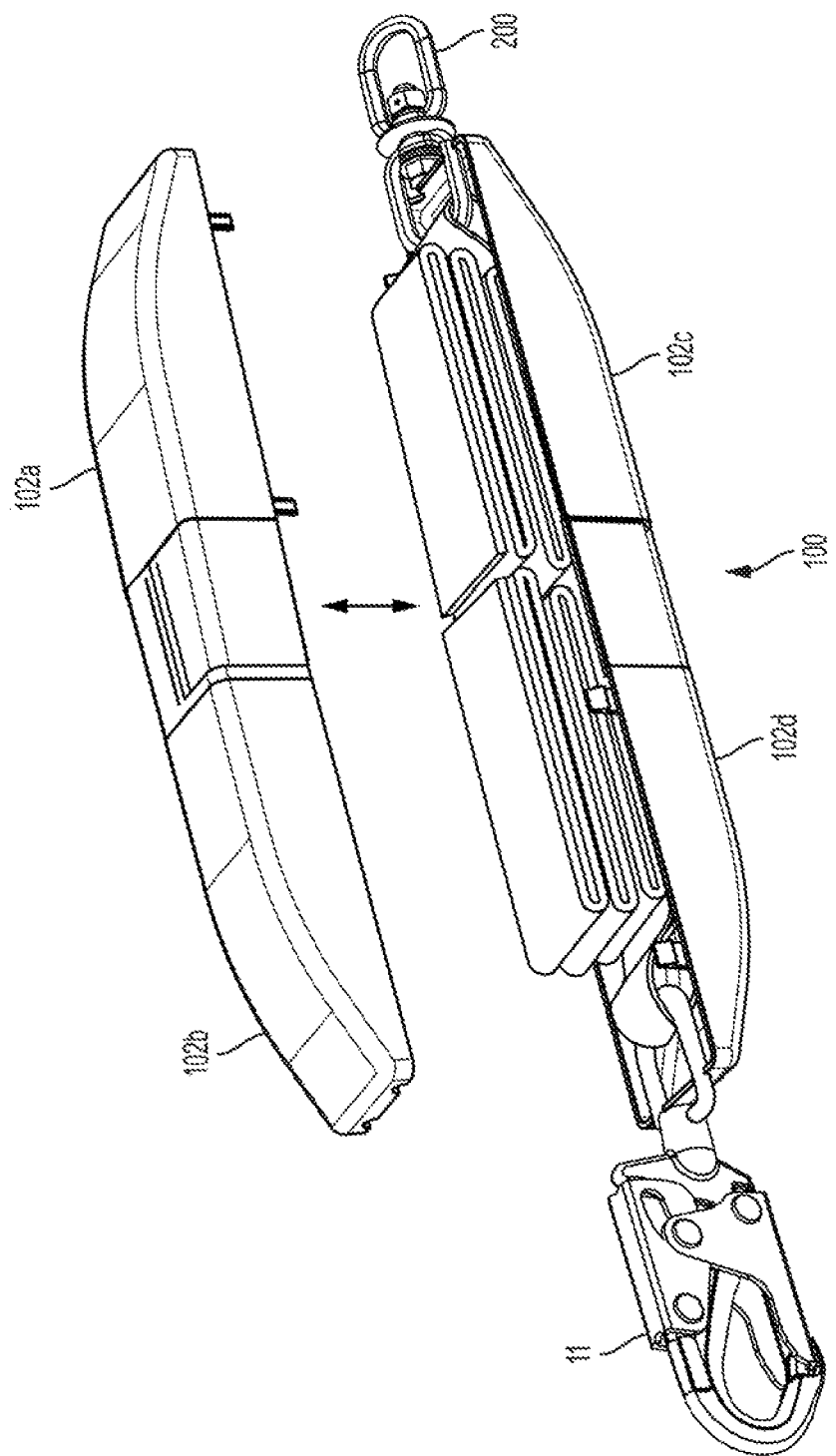
Figure 6:
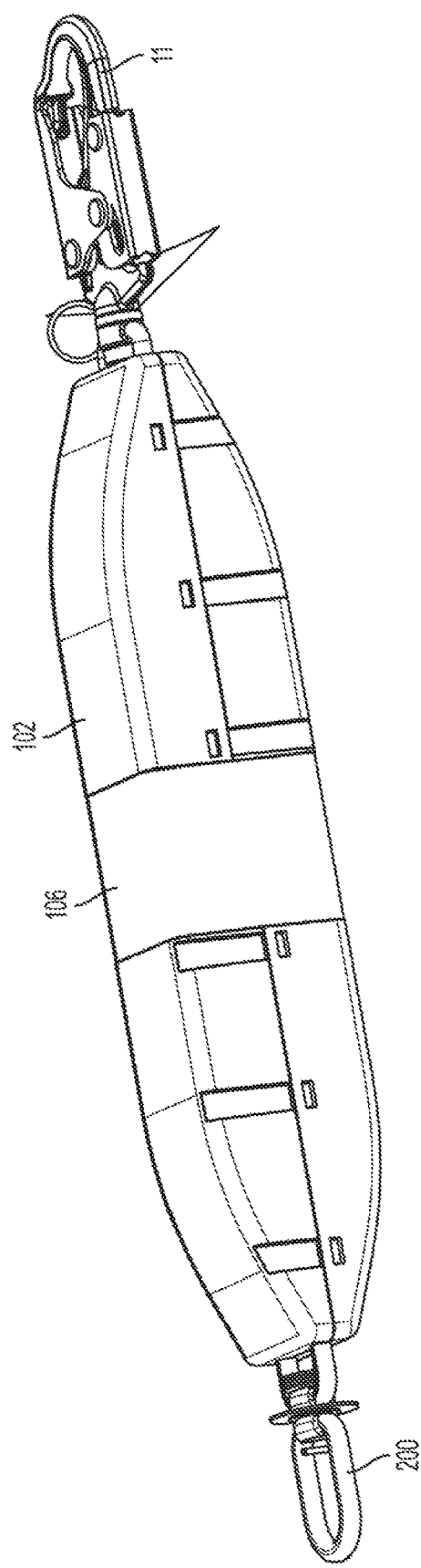

FIGS. 3-6 illustrate an assembly of the energy absorber 100 in accordance with an example embodiment of the disclosed concept. The cover 102 includes four cover pieces 102a, 102b, 102c, and 102d. The four cover pieces 102a, 102b, 102c, and 102d are structured to interlock together to form the cover 102. An exploded view before the four cover pieces 102a, 102b, 102c, and 102d are interlocked together is shown in FIG. 3 and the completed cover 102 after the four cover pieces 102a, 102b, 102c, and 102d have been interlocked is shown in FIG. 6.

Intermediate assembly steps are shown in FIGS. 4 and 5. As shown in FIG. 4, the cover pieces 102a and 102b slide together and cover pieces 102c and 102d slide together. In the illustration of FIG. 4, cover pieces 102c and 102d are already joined and cover pieces 102a and 102b are in the process of being joined. FIG. 5 shows the joining of the combination of cover pieces 102a and 102b with the combination of cover pieces 102c and 102d. The combination of cover pieces 102a and 102b snaps together with the combination of cover pieces 102c and 102d to complete the cover 102. That is, cover piece 102a snaps together with cover piece 102c and cover piece 102b snaps together with cover piece 102d. Mechanisms that facilitate sliding together and snapping together of the cover pieces 102a, 102b, 102c, and 102d will be described in more detail with respect to FIGS. 7-11.

FIG. 6 shows the assembled cover 102. In some example embodiments of the disclosed concept, the cover 102 may include a label 106 that is disposed over a central portion of the cover 102. The label 104 may be disposed around interlocking sections of the cover pieces 102a, 102b, 102c, and 102d. For example and without limitation, the label 106 may be an adhesive label that prevents the cover pieces 102a, 102b, 102c, and 102d from sliding apart. However, the label 106 may be structured such that in the event of a fall, the forces on the cover 102 and label 106 are sufficient to cause the cover pieces 102a, 102b, 102c, and 102d to slide apart and allow the energy absorber 100 to deploy and release the webbing 104.

Figure 7:
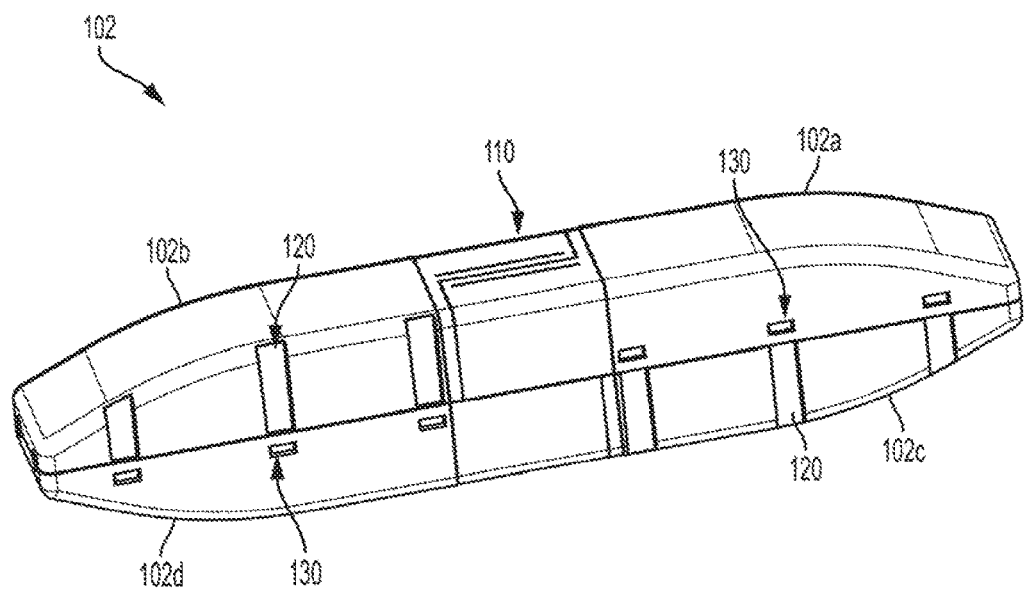
FIG. 7 is a view of an assembled cover for an energy absorber in accordance with an example embodiment of the disclosed concept.

FIG. 7 is a view of the cover 102 and FIGS. 8-11 are views of one of the cover pieces 102a in accordance with an example embodiment of the disclosed concept. In some example embodiments of the disclosed concept, each of the cover pieces 102a, 102b, 102c, and 102d are substantially the same as each other.

The cover piece 102a includes an interlocking section 110, tabs 120, and tab receivers 130. The interlocking section 110 is structured to slide into the interlocking section of another cover piece. The tabs 120 are structured to snap together with the tab receivers of another cover piece and the tab receivers 130 are structured to snap together with the tabs of another cover piece. Sliding and snapping together the four cover pieces 102a, 102b, 102c, and 102d in this manner results in the assembled cover 102.

Figure 8:
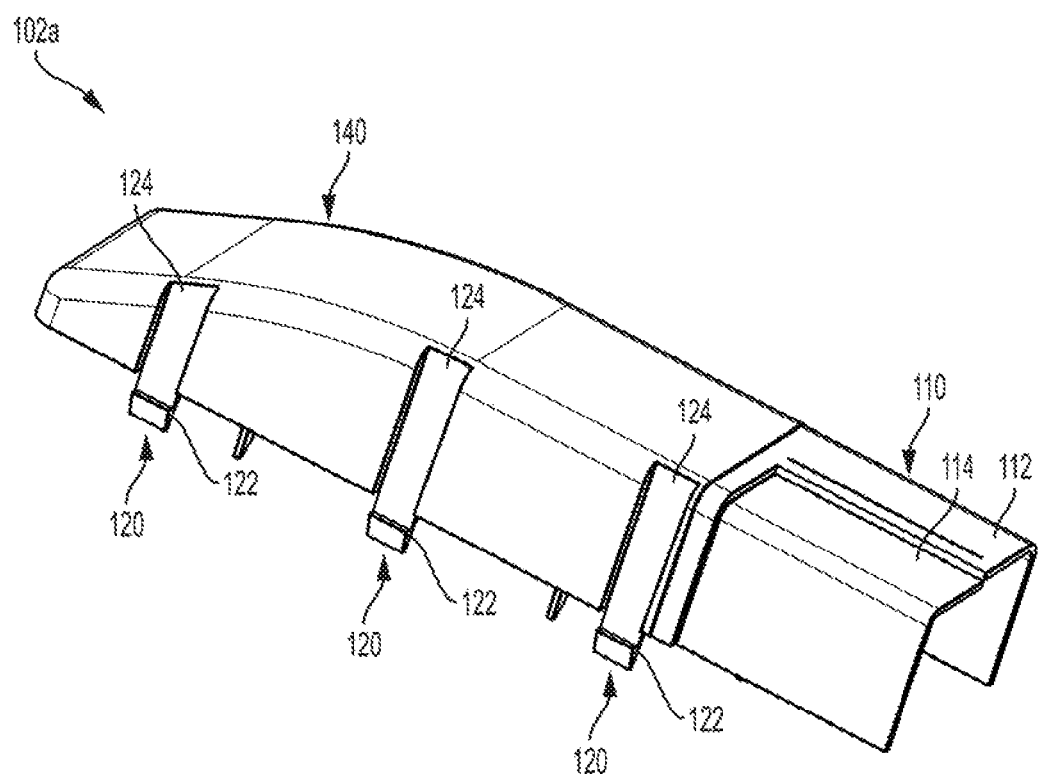
FIGS. 8-11 are views of a cover piece in accordance with an example embodiment of the disclosed concept.
Figure 9:
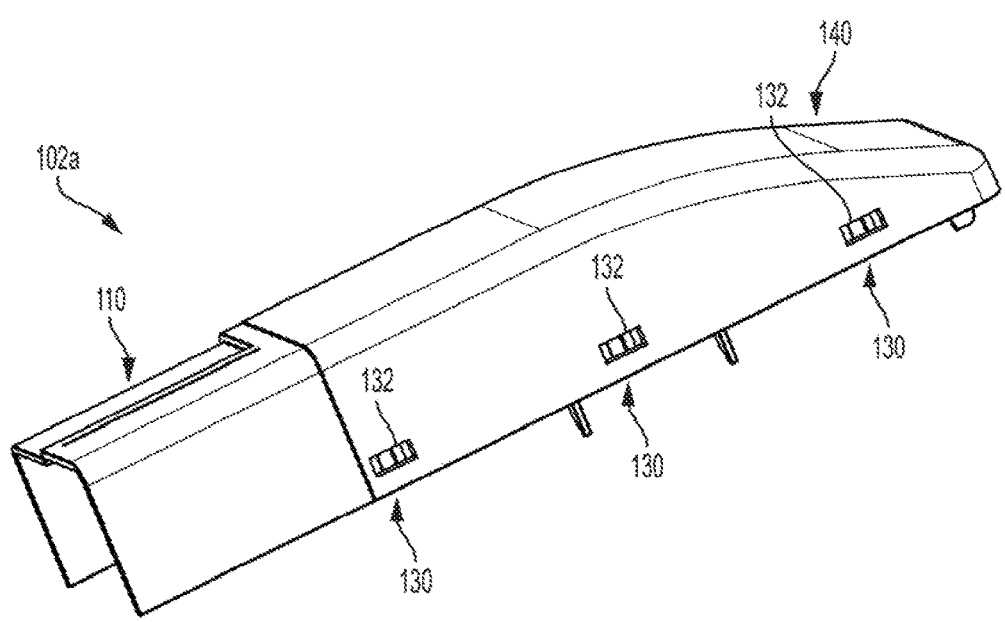

The interlocking section 110 includes a first portion 112 and a second portion 114 (shown in FIG. 8). The first portion 112 is offset with respect to the second portion 114. That is, the top surfaces of the first and second portions 112,114 are offset with respect to each other by a predetermined distance. When the interlocking section 100 of the cover piece 102a is slid together with the interlocking section 100 of another one of the cover pieces 102b (see FIG. 4), the first portion 112 of the interlocking section 100 of the cover piece 102a slides over the second portion 114 of the interlocking section 100 of the other cover pieces 102b. Similarly, the second portion 114 of the interlocking section 100 of the cover piece 102a slides under the first portion 112 of the interlocking section 100 of the other cover piece 102b. Once the cover 102 is assembled, the label 106 may be disposed around the interlocking sections 100 of the cover pieces 102a, 102b, 102c, and 102d, as is shown in FIG. 6.

The cover piece 102a has a first side and a second side opposite the first side. The tabs 120 are disposed on the first side and the tab receivers 130 are disposed on the second side. When the cover piece 102a is snapped together with another cover piece 102d, the cover pieces 102a and 102d are inverted with respect to each other so that the tabs 120 of the cover piece 102a align with the tab receivers 130 of the other cover piece 102d (see FIG. 5).

Figure 11:
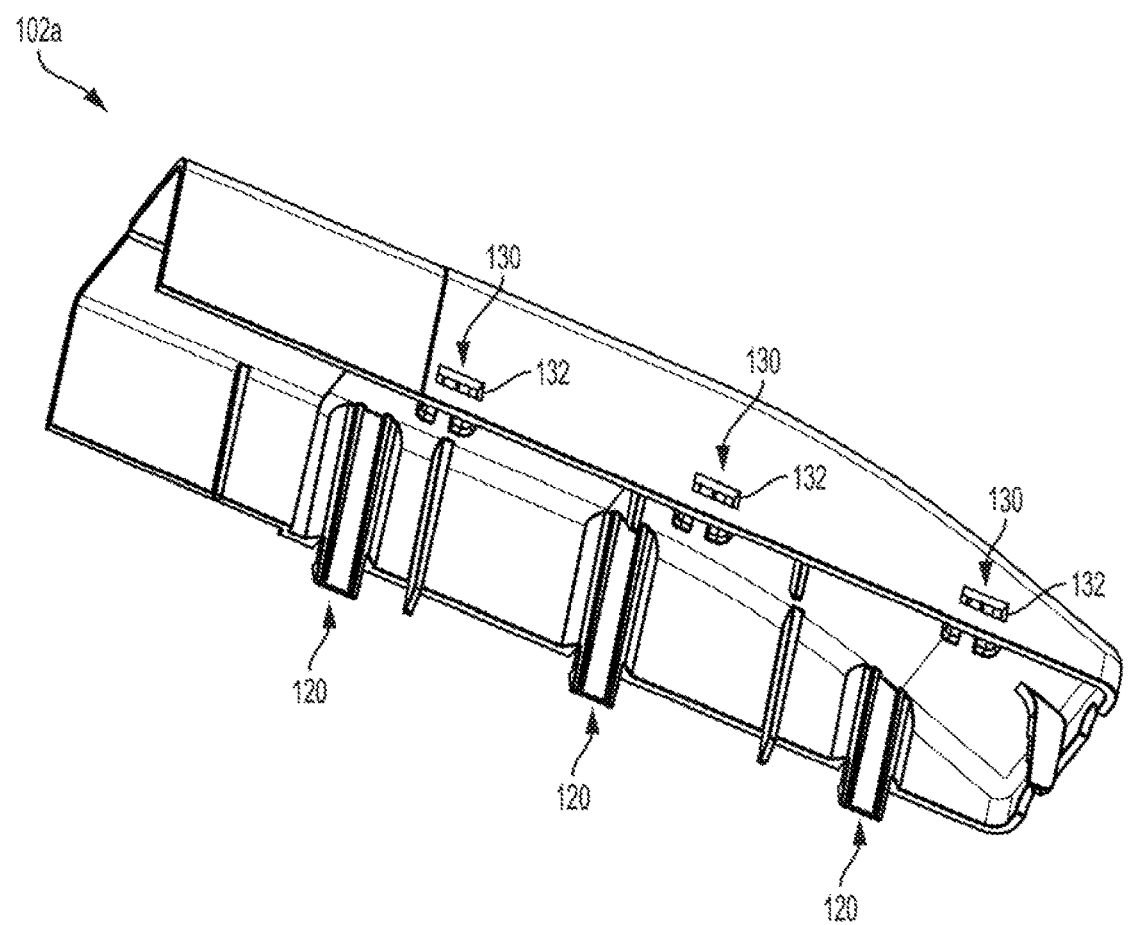

The tabs 120 include a snap member 122 and a depression 124. The tab receivers 130 include an opening 132 and a receiving track 134. The snap member 122 is structured to snap into the opening 132 of the tab receiver 130 of another cover piece 102d (see FIG. 5). The tabs 120 are depressed into the side of the cover piece 102a via the depression 124. As shown in FIG. 11, the depression 124 causes the tab 120 to extend inward into the interior of the cover piece 102a. The tab receiver 130 includes the receiving track 134 that is formed on an interior of the cover piece 102a. The receiving track 134 is structured to receive and allow the tab 120 of another cover piece 102c to slide into it.

In some example embodiments of the disclosed concept, the tabs 120 extend the height of the first side of the cover piece 102a and then continue beyond the end of the first side of the cover piece 102a. For example, the depression 124 may extend the entire height of the first side of the cover piece 102a. In some example embodiments, the snap member 122 may be disposed at an end of the depression 124 in an area extended beyond the height of the first side of the cover piece 102a. In this manner, the snap member 122 may extend into the interior of another cover piece 102c and snap into the opening 132 of the tab receiver 130 of the other cover piece 102c. Additionally, the tab 120 may extend into the receiving track 134 of the tab receiver 130 of the other cover piece 102c.

In some example embodiments, the snap member 122 has a triangular cross-section with a flat portion of the triangular cross-section being structured to corresponding to a side of the opening 132 of the other cover piece 102c. The cross-sectional shape of the snap member 122 allows the snap member 122 to easily slide into the tab receiver 130 and snap into the opening 132. However, the snap member 122 will not slide out of tab receiver 130 until the snap member 122 is snapped free from the opening 132.

In some example embodiments of the disclosed concept, the cover piece 102 has 3 tabs 120 and 3 tab receivers 130. The tabs 120 and tab receivers 130 are spaced along the length of the cover piece 102a. Each tab 120 has a corresponding tab receiver 130 disposed directly opposite of it so that when the cover piece 102a is snapped together with another cover piece 102c, the tabs 120 of the cover piece 102 align with the tab receivers 130 of the other cover piece 102c and vice versa. It will be appreciated by those having ordinary skill in the art that other numbers of tabs 120 and tab receivers 130 may be employed without departing from the scope of the disclosed concept.

The cover piece 102a may have a tapered shape. That is, one end of the cover piece 102a has a first height and the opposite end of the cover piece 102a has a second height that is less that the first height. The cover piece 102a includes a taper section 140. The taper section 140 tapers from the first height to the second height along across a portion of the length of the cover piece 102a. The taper section 140 may be disposed at an end of the cover piece 102a opposite the interlocking section 110. The resulting cover 102 may have a central portion, including the interlocking sections 110 that has a greater height than its end portions, as shown for example in FIG. 7.

In an example embodiment of the disclosed concept, the four cover pieces include a first cover piece 102a, a second cover piece 102b, a third cover piece 102c, and a fourth cover piece 102d, as shown in FIG. 7. In the example embodiment, the four cover pieces 102a, 102b, 102c, and 102d join together in the following manner. The interlocking section 110 of the first cover piece 102a is structured to slide into the interlocking section 110 of the second cover piece 102b, the tabs 120 of the first cover piece 102a are structured snap together with the tab receivers 130 of the third cover piece 102c, and the tab receivers 130 of the first cover piece 102a are structured to snap together with the tabs 120 of the third cover piece 102c. The interlocking section 110 of the second cover piece 102b is structured to slide into the interlocking section 110 of the first cover piece 102a, the tabs 120 of the second cover piece 102b are structured snap together with the tab receivers 130 of the fourth cover piece 102d, and the tab receivers 130 of the second cover piece 102b are structured to snap together with the tabs of the fourth cover piece 102d. The interlocking section 110 of the third cover piece 102c is structured to slide into the interlocking section 110 of the fourth cover piece 102d, the tabs 120 of the third cover piece 102c are structured snap together with the tab receivers 130 of the first cover piece 102a, and the tab receivers 130 of the third cover piece 102c are structured to snap together with the tabs 120 of the first cover piece 102a. The interlocking section 110 of the fourth cover piece 102d is structured to slide into the interlocking section 110 of the third cover piece 102c, the tabs 120 of the fourth cover piece 102d are structured snap together with the tab receivers 130 of the second cover piece 102b, and the tab receivers 130 of the fourth cover piece 102d are structured to snap together with the tabs 120 of the second cover piece 102b.

Figure 12:
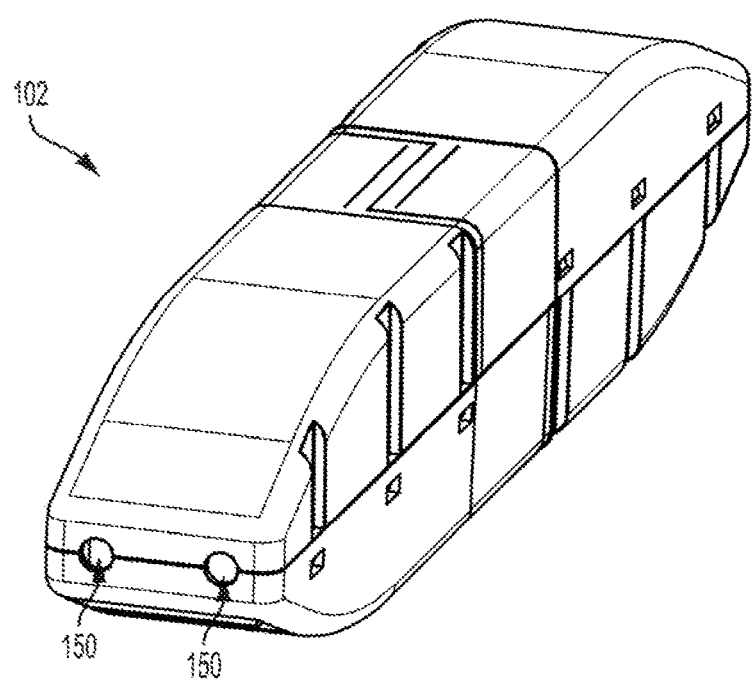
FIG. 12 is a view of an end of a cover for an energy absorber in accordance with an example embodiment of the disclosed concept.

FIG. 12 is another view of the cover 102 in accordance with an example embodiment of the disclosed concept. As shown in FIG. 12, the cover 102 includes circular openings 150 at its end. The other end (not shown) of the cover 102 also includes similar circular openings. The circular openings 150 may receive connectors such as connection rings of the termination arrangement 11 and the load indicator 200. As shown, for example, in FIGS. 5 and 6, the circular openings 150 allow the termination arrangement 11 and load indicator 200 to pass into the cover 102 and connect to the webbing 104.

Figure 10:
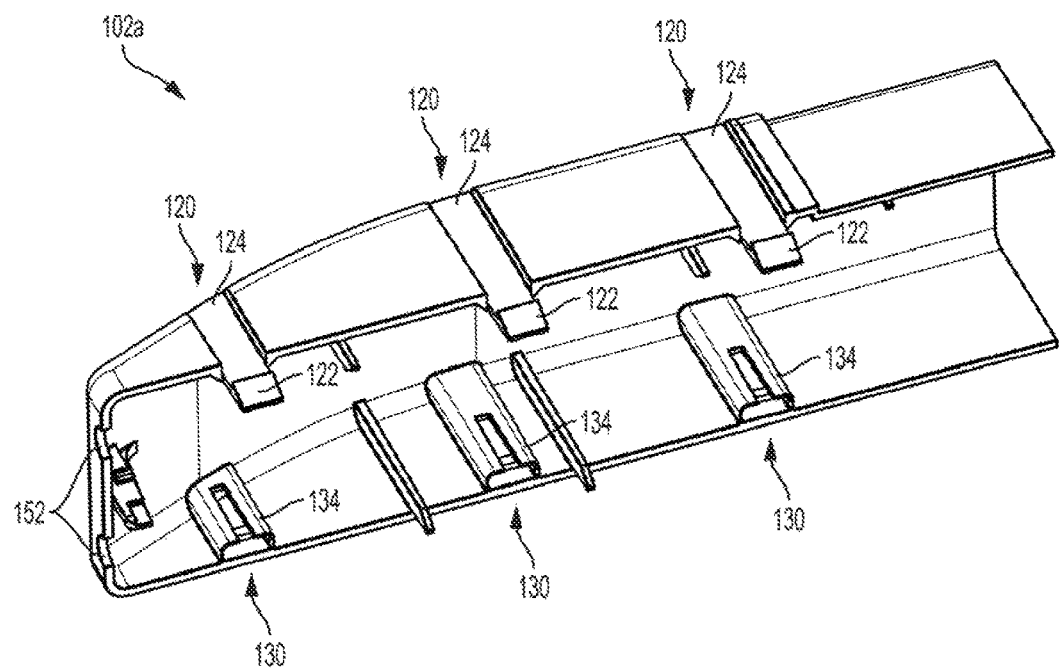

The circular openings 150 are formed from semi-circular openings 152 formed in the end of the cover piece 102a (shown in FIG. 10). When the cover piece 102a is snapped together with another cover piece 102d having the same semi-circular openings 152, the semi-circular openings 152 combine to form the circular opening 150 shown in FIG. 12. The termination arrangement 11 and the load indicator 200 may be connected to the webbing 104 before snapping the cover pieces 102a, 102b, 102c, and 102d together (shown in FIG. 5).

In some example embodiments of the disclosed concept, the cover pieces 102a, 102b, 102c, and 102d are made of rigid material such as plastic. It will be appreciated that the cover pieces 102a, 102b, 102c, and 102d may be composed of other materials without departing from the scope of the disclosed concept.

Figure 13:
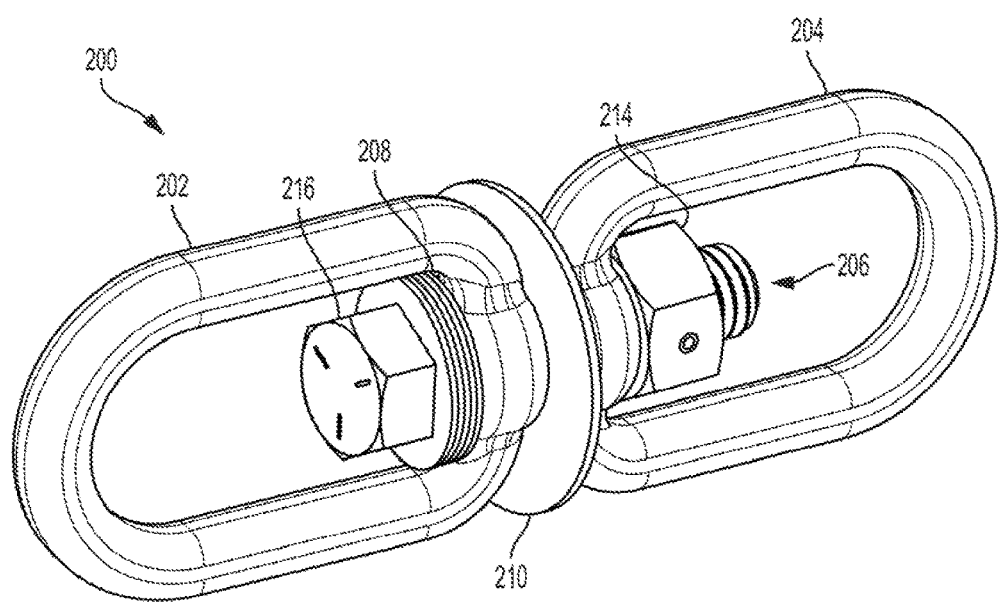
FIGS. 13 and 14 are views of a load indicator in accordance with an example embodiment of the disclosed concept.
Figure 14:
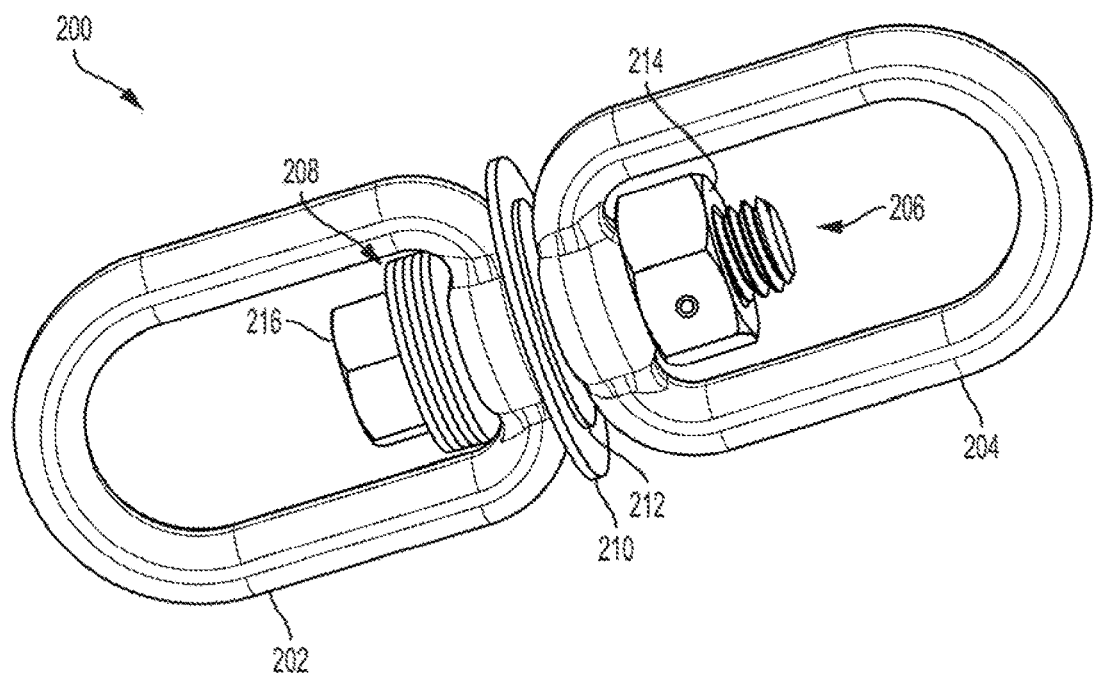

FIGS. 13 and 14 are views of the load indicator 200 in accordance with an example embodiment of the disclosed concept. The load indicator 200 includes a first connector 202 and a second connector 204. In some example embodiments, the first and second connectors 202,204 are rings. However, other types of connectors may be employed without departing from the scope of the disclosed concept. Pulling the first and second connectors 202,204 in opposite directions applies tension across the load indicator 200. For example, the first connector 202 may be connected to the energy absorber (shown for example in FIG. 15) and the second connector 204 may be connected to the tensioner 30 (also shown for example in FIG. 15). When the load indicator 200 is connected to the horizontal lifeline system 10 in this matter, the tension applied across the load indicator 200 is substantially the same as the tension applied to the horizontal lifeline cable 20.

The load indicator 200 further includes a fastener 206. The fastener 206 is structured to attach the first connector 202 to the second connector 204. In some example embodiments of the disclosed concept the fastener 206 includes a nut 214 and a bolt 216. The bolt 216 is threaded through openings in the first and second connectors 202,204 and then the nut 214 is attached to the bolt such that the first and second connectors 202,204 are disposed between the head of the bolt 216 and the nut 214. It will be appreciated by those having ordinary skill in the art that other types of fasteners may be employed without departing from the scope of the disclosed concept.

The load indicator 200 also includes a moveable member 210 disposed between the first and second connectors 202, 204. The moveable member 210 is also disposed around the fastener 206. In some example embodiments of the disclosed concept, the moveable member 210 is a washer. However, it will be appreciated that other variations of the moveable member 210 may be employed without departing from the scope of the disclosed concept.

A first spring 208 is disposed between the head of the bolt 216 and the first connector 202. The first spring 208 is structured to apply bias to the fastener 206 to pull the first and second connectors 202,204 together. For example, the first spring 208 is disposed between the head of the bolt 216 and the first connector 202 and applies bias forces to the fastener 206 and the first connector 202 in opposite directions. These bias forces pull the nut 214, and thus the second connector 204 towards the first connector 202.

A second spring 212 is disposed between the second connector 204 and the moveable member 210. It will be appreciated that the second spring 212 may also be disposed between the first connector 202 and the moveable member 210. The second spring is structured to apply bias against the moveable member 210 to press the moveable member 210 against the first connector 202.

Figure 16A:
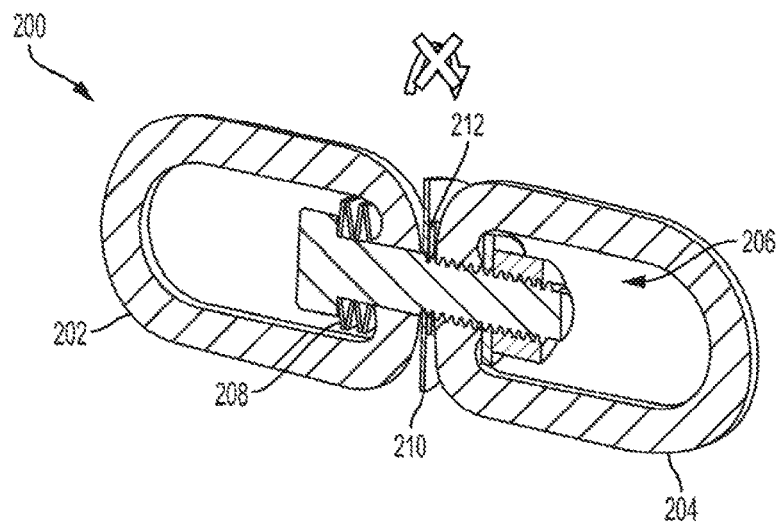
FIGS. 16A and 16B are cross-section views of a load indicator in accordance with example embodiments of the disclosed concept.
Figure 16B:
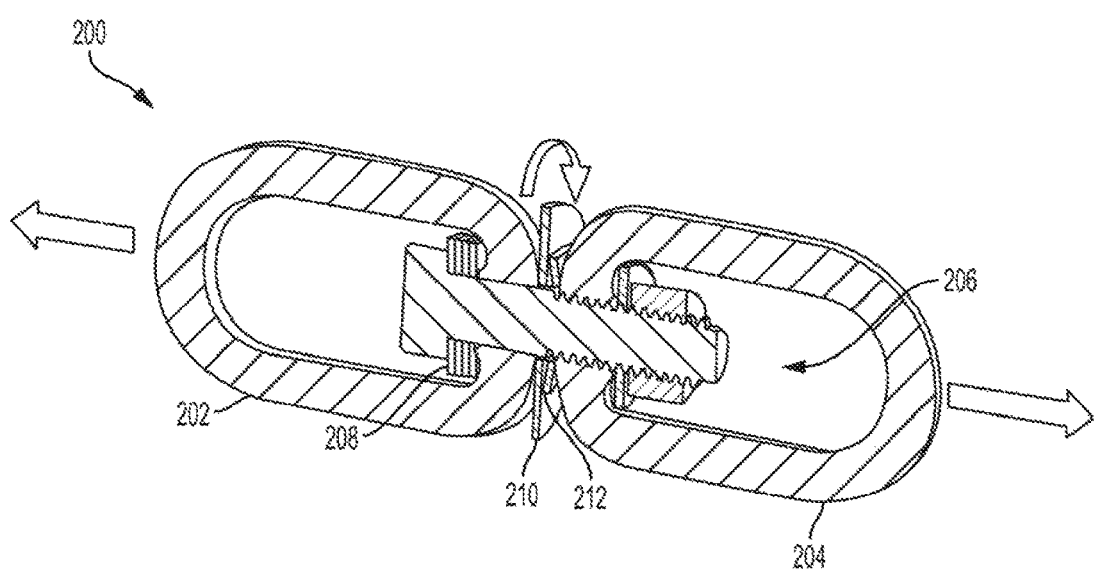

FIGS. 16A and 16B are cross-sectional views of the load indicator 200 in accordance with an example embodiment of the disclosed concept. Operation of the load indicator 200 will be described with respect to FIGS. 16A and 16B.

The load indicator 200 is structured to provide an indication when the tension across it is at or above a predetermined tension level. In some example embodiments of the disclosed concept, the predetermined tension level is about 400 lbs. However, it will be appreciated by those having ordinary skill in the art that any predetermined tension level may be employed without departing from the scope of the disclosed concept. The indication provided by the load indicator 200 is the ability of the moveable member 210 to spin freely about the fastener 206. That is, when the tension across the load indicator 200 is less than the predetermined tension level, the moveable member 210 is not able to spin freely about the fastener 206. When the tension across the load indicator 200 is at or greater than the predetermined tension level, the moveable member 210 is able to spin freely about the fastener 206. In this manner, a worker may attempt to spin the moveable member 210 to check whether sufficient tension has been applied to the horizontal lifeline cable 20.

For example, when the load indicator 200 is manufactured, the bolt 216 and nut 214 are tightened relative to each other such that the second spring 212 is compressed but the first spring 208 is only partially compressed (e.g., in the state shown in FIG. 16A), which leaves a moveable distance between bolt 216 and the first connector 202. The bolt and nut are permanently locked relative to each other such that the distance between them is fixed. The first spring 208 applies a bias force which tends to reduce the distance between the first and second connectors. When the distance between the first and second connectors 202,204 is sufficiently small, the compressive force exerted by the second spring 212 presses the moveable member 210 against the first connector 202 (e.g., in the state shown in FIG. 16A). The pressure and frictional forces between the moveable member 210 and the second spring 212 and first connector 202 prevent the moveable member 210 from spinning freely about the fastener 206. FIG. 16A illustrates the state where the tension across the load indicator 200 is less than the predetermined tension level. As shown in FIG. 16A, the second spring 212 remains compressed while the first spring 208 is expanded. In the state shown in FIG. 16A, the moveable member 210 is unable to spin freely about the fastener 206, indicating that the tension across the load indicator 200 is less than the predetermined tension level.

FIG. 16B illustrates a state where the tension across the load indicator 200 is at or greater than the predetermined tension level. As shown in FIG. 16B, the tension across the load indicator 200 causes the first spring 208 to compress. In other words, the tension is sufficient to counter the bias force applied by the first spring 208, cause the first spring 208 to compress, and pull the first and second connectors 202,204 apart by the distance the first spring 208 has compressed. When the first and second connectors 202,204 are pulled apart, the distance between the first and second connectors 202,204 increases such that the second spring 212 expands and is no longer compressed between the second connector 204 and the moveable member 210. In this state, the second spring 212 cannot bias the moveable member 210 against the first connector 202. In some example embodiments, the second spring 212 is a disc spring such as a belleville washer which can only apply a bias force when it is substantially compressed between two objects. When the objects are separated by a short distance, the second spring 212 becomes decompressed and can no longer apply a bias force. In the state shown in FIG. 16B, the moveable member 210 is not pressed against the first connector 202. As such, the moveable member 210 is able to spin freely. By attempting to spin the moveable member 210, a worker may determine whether there is sufficient tension applied across the load indicator 200.

In some example embodiments of the disclosed concept, the first and second springs 208,210 are able to compress different distances. For example, the first spring 208 may compress a further distance than the second spring 210. That is, the difference between the compressed and expanded length of the first spring 208 is greater than the difference between the compressed and expanded length of the second spring 210. The first and second springs 208,210 may be selected such that the first spring 208 compresses by enough distance at the predetermined tension level such that the distance between the first and second connectors 202,204 increases enough that the second spring 212 expands and no longer biases the moveable member 210 against the first connector 202.

In some example embodiments, the first spring 208 and the second spring 212 may be comprised of one or more disc springs such as belleville washers. However, it will be appreciated that other types of springs may be employed without departing from the scope of the disclosed concept. In an example embodiment, the first spring 208 is comprised of a plurality (e.g., without limitation, 4) disc springs and the second spring 212 is comprised of one disc spring. However, it will be appreciated that different number of disc springs may be employed in the first and second springs 208,212 without departing from the scope of the disclosed concept. In some example embodiments of the disclosed concept, the first spring 208 has a higher biasing force than the second spring 212. It will also be appreciated by those having ordinary skill in the art that the second spring 212 may be omitted. For example, the bias force applied by the first spring 208 may be sufficient to prevent the moveable member 210 from spinning freely when the tension across the load indicator 200 is less than the predetermined tension level.

The energy absorber 100 and the load indicator 200 may be employed together in a horizontal lifeline system 10 such as that shown in FIG. 1. It will also be appreciated that only one of the energy absorber 100 and the load indicator 200 may be employed in a horizontal lifeline system without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A load indicator comprising:
   a first connector;
   a second connector arranged such that pulling the first connector and the second connector in opposite directions applies tension across the load indicator;
   a fastener structured to attach the first connector to the second connector;
   a first spring structured to apply bias to the fastener to pull the first and second connectors together; and
   a moveable member disposed between the first and second connectors and around the fastener,
   wherein when the tension across the load indicator is at or above a predetermined tension level, the first spring compresses allowing the moveable member to be spun and rotate freely about the fastener,
   wherein when the tension across the load indicator is below the predetermined tension level, the first spring pulls the first and second connectors together such that the moveable member cannot spin freely about the fastener, and
   wherein the fastener includes a bolt and a nut, wherein the bolt includes a head, wherein the first spring is disposed between the head of the bolt and the first connector, and wherein the first spring is structured to bias the head of the bolt and the first connector in opposite directions to pull the first and second connectors together.

2. The load indicator of claim 1, further comprising:
   a second spring disposed between one of the first and second connectors and the moveable member and being structured to apply bias against the moveable member to press the moveable member against one of the first and second connectors,
   wherein when the tension across the load indicator is at or above a predetermined tension level, the first and second connectors are pulled apart such that the second spring cannot bias the moveable member against one of the first and second connectors allowing the moveable member to be spun and rotate freely about the fastener, and
   wherein when the tension across the load indicator is below the predetermined tension level, the first and second connectors are close enough together such that the second spring biases the moveable member against one of the first and second connectors such that the moveable member cannot spin freely about the fastener.

3. The load indicator of claim 2, wherein the first spring is structured to compress a greater distance than the second spring.

4. The load indicator of claim 2, wherein the second spring is a disc spring disposed about the fastener.

5. The load indicator of claim 1, wherein the moveable member is a washer disposed about the fastener.

6. The load indicator of claim 1, wherein the first spring includes a disc spring.

7. The load indicator of claim 1, wherein the first spring includes a plurality of disc springs.

8. The load indicator of claim 1, wherein the predetermined tension level is at least about 400 lbs.

9. The load indicator of claim 1, wherein at least one of the first connector and the second connector is a ring.

10. A horizontal lifeline system comprising:
a first termination arrangement structured to attach to a first anchor point;
a second termination arrangement structured to attach to a second anchor point;
a horizontal lifeline cable coupled to the first termination arrangement;
a load indicator coupled between the first and second termination arrangements, the load indicator comprising:
   a first connector;
   a second connector arranged such that pulling the first connector and the second connector in opposite directions applies tension across the load indicator;
   a fastener structured to attach the first connector to the second connector;
   a first spring structured to apply bias to the fastener to pull the first and second connectors together; and
   a moveable member disposed between the first and second connectors and around the fastener,
   wherein when the tension across the load indicator is at or above a predetermined tension level, the first spring compresses allowing the moveable member to be spun and rotate freely about the fastener,
   wherein when the tension across the load indicator is below the predetermined tension level, the first spring pulls the first and second connectors together such that the moveable member cannot spin freely about the fastener,
   wherein the tension across the load indicator is substantially the same as tension in the horizontal lifeline cable, and
   wherein the fastener includes a bolt and a nut, wherein the bolt includes a head, wherein the first spring is disposed between the head of the bolt and the first connector, and wherein the first spring is structured to bias the head of the bolt and the first connector in opposite directions to pull the first and second connectors together.

11. The horizontal lifeline system of claim 10, further comprising:
an energy absorber coupled between the first and second termination arrangements and being structured to deploy during a fall; and
a tensioner coupled between the first and second termination arrangements and being structured to adjust tension in the horizontal lifeline cable.

12. The horizontal lifeline system of claim 11, wherein the first connector is coupled to the energy absorber and the second connector is coupled to the tensioner.

13. The horizontal lifeline system of claim 10, wherein the load indicator further comprises:
a second spring disposed between one of the first and second connectors and the moveable member and being structured to apply bias against the moveable member to press the moveable member against one of the first and second connectors,
wherein when the tension across the load indicator is at or above a predetermined tension level, the first and second connectors are pulled apart such that the second spring cannot bias the moveable member against one of the first and second connectors allowing the moveable member to be spun and rotate freely about the fastener, and
wherein when the tension across the load indicator is below the predetermined tension level, the first and second connectors are close enough together such that the second spring biases the moveable member against one of the first and second connectors such that the moveable member cannot spin freely about the fastener.

14. The horizontal lifeline system of claim 13, wherein the first spring is structured to compress a greater distance than the second spring.

15. The horizontal lifeline system of claim 13, wherein the second spring is a disc spring disposed about the fastener.

16. The horizontal lifeline system of claim 10, wherein the moveable member is a washer disposed about the fastener.

17. The horizontal lifeline system of claim 10, wherein the first spring includes at least one disc spring.

* * * * *